(12) United States Patent
Miller

(10) Patent No.: US 7,547,847 B2
(45) Date of Patent: Jun. 16, 2009

(54) HIGH THERMAL CONDUCTIVITY DIELECTRIC TAPE

(75) Inventor: Mark L. Miller, Charlotte, NC (US)

(73) Assignee: Siemens Energy, Inc., Orlando, FL (US)

(*) Notice: Subject to any disclaimer, the term of this patent is extended or adjusted under 35 U.S.C. 154(b) by 87 days.

(21) Appl. No.: 11/523,238

(22) Filed: Sep. 19, 2006

(65) Prior Publication Data

US 2008/0066942 A1    Mar. 20, 2008

(51) Int. Cl.
 *H01B 7/00* (2006.01)
(52) U.S. Cl. .................................. 174/120 R
(58) Field of Classification Search ............ 174/120 R, 174/120 SR, 137 R
See application file for complete search history.

(56) References Cited

U.S. PATENT DOCUMENTS

| | | | |
|---|---|---|---|
| 3,246,271 A | 4/1966 | Ford | |
| 3,866,316 A | 2/1975 | Takechi et al. | |
| 3,974,302 A | 8/1976 | Croop et al. | |
| 4,001,616 A | 1/1977 | Lonseth et al. | |
| 4,160,926 A | 7/1979 | Cope et al. | |
| 4,335,367 A | 6/1982 | Mitsui et al. | |
| 4,361,661 A | 11/1982 | Jackson | |
| 4,400,226 A | 8/1983 | Horrigan | |
| 4,427,740 A | 1/1984 | Stackhouse et al. | |
| 4,634,911 A | 1/1987 | Studniarz et al. | |
| 4,694,064 A | 9/1987 | Tomalia et al. | |
| 4,704,322 A | 11/1987 | Roberts | |
| 4,760,296 A | 7/1988 | Johnston et al. | |
| 4,806,806 A | 2/1989 | Hjortsberg et al. | |
| 5,011,872 A | 4/1991 | Latham et al. | |
| 5,037,876 A | 8/1991 | Birkle et al. | |
| 5,126,192 A | 6/1992 | Chellis et al. | |
| 5,281,388 A | 1/1994 | Palmer et al. | |
| 5,466,431 A | 11/1995 | Dorfman et al. | |
| 5,510,174 A | 4/1996 | Litman | |
| 5,540,969 A | 7/1996 | Schuler | |
| 5,578,901 A | 11/1996 | Blanchet-Fincher et al. | |
| 5,723,920 A | 3/1998 | Markovitz et al. | |
| 5,780,119 A | 7/1998 | Dearnaley et al. | |

(Continued)

FOREIGN PATENT DOCUMENTS

EP     0 157 936 A1    10/1985

(Continued)

OTHER PUBLICATIONS

Tari et al., "Impacts on Turbine Generator Design by the Application of Increased Thermal Conducting Stator Insulation" Cigre SC11-01 Meeting, Paper No. 132 (2002).

(Continued)

*Primary Examiner*—Chau N Nguyen

(57) ABSTRACT

An electrical insulation tape that has a first and second carrier layer, and a dielectric thermally conductive, electrically insulative filler layer (24) that has mica particles/flakelets (6), filler particles (26) and a binder resin (28), disposed between the first and second carrier layers. The dielectric filler layer has mica flakelets (30), filler particles (32) and a binder resin. The ratio of mica flakelets to filler particles is at least 1:1 by volume, and the percentage of binder resin in the dielectric filler layer is 35-50% by volume. The first and second carrier layers are impregnated with a second resin.

11 Claims, 2 Drawing Sheets

U.S. PATENT DOCUMENTS

| | | |
|---|---|---|
| 5,801,334 A | 9/1998 | Theodorides |
| 5,878,620 A | 3/1999 | Gilbert et al. |
| 5,904,984 A | 5/1999 | Smith et al. |
| 5,938,934 A | 8/1999 | Balogh et al. |
| 5,982,056 A | 11/1999 | Koyama et al. |
| 6,015,597 A | 1/2000 | David |
| 6,048,919 A | 4/2000 | McCullough |
| 6,103,382 A | 8/2000 | Smith et al. |
| 6,130,495 A | 10/2000 | Schulten et al. |
| 6,130,496 A | 10/2000 | Takigawa et al. |
| 6,140,590 A | 10/2000 | Baumann et al. |
| 6,160,042 A | 12/2000 | Ishida |
| 6,190,775 B1 | 2/2001 | Smith et al. |
| 6,238,790 B1 | 5/2001 | Smith et al. |
| 6,255,738 B1 | 7/2001 | Distefano et al. |
| 6,261,424 B1 | 7/2001 | Goncharenko et al. |
| 6,261,481 B1 | 7/2001 | Akatsuka et al. |
| 6,265,068 B1 | 7/2001 | David et al. |
| 6,288,341 B1 | 9/2001 | Tsunoda et al. |
| 6,344,271 B1 | 2/2002 | Yadav et al. |
| 6,359,232 B1 | 3/2002 | Markovitz et al. |
| 6,393,642 B1 | 5/2002 | Pollman et al. |
| 6,396,864 B1 | 5/2002 | O'Brien et al. |
| 6,432,537 B1 | 8/2002 | Devlin et al. |
| 6,504,102 B2 | 1/2003 | Tsunoda |
| 6,506,331 B2 | 1/2003 | Meguriya |
| 6,509,063 B1 | 1/2003 | McCarthy |
| 6,548,172 B2 | 4/2003 | David et al. |
| 6,572,937 B2 | 6/2003 | Hakovirta et al. |
| 6,632,561 B1 | 10/2003 | Bauer et al. |
| 6,635,720 B1 | 10/2003 | Tomalia et al. |
| 6,746,758 B2 | 6/2004 | Tsunoda et al. |
| 6,821,672 B2 | 11/2004 | Zguris |
| 6,882,094 B2 | 4/2005 | Dimitrijevic et al. |
| 6,905,655 B2 | 6/2005 | Gabriel et al. |
| 6,974,627 B2 | 12/2005 | Morita et al. |
| 7,033,670 B2 | 4/2006 | Smith |
| 7,042,346 B2 | 5/2006 | Paulsen |
| 7,120,993 B2 | 10/2006 | Yamamoto et al. |
| 7,180,409 B2 | 2/2007 | Brey |
| 7,189,778 B2 | 3/2007 | Tobita et al. |
| 7,425,366 B2 | 9/2008 | Okamoto et al. |
| 2002/0058140 A1 | 5/2002 | Dana et al. |
| 2002/0070621 A1 | 6/2002 | Mori et al. |
| 2002/0098285 A1 | 7/2002 | Hakovirta et al. |
| 2003/0035960 A1 | 2/2003 | Tsunoda et al. |
| 2003/0040563 A1 | 2/2003 | Sagal et al. |
| 2004/0094325 A1 | 5/2004 | Yoshida et al. |
| 2004/0152829 A1 | 8/2004 | Tobita et al. |
| 2004/0241439 A1 | 12/2004 | Morita et al. |
| 2005/0097726 A1 | 5/2005 | Yamamoto et al. |
| 2005/0116336 A1 | 6/2005 | Chopra et al. |
| 2005/0161210 A1 | 7/2005 | Zhong et al. |
| 2005/0208301 A1 | 9/2005 | Okamoto et al. |
| 2005/0236606 A1 | 10/2005 | Toas et al. |
| 2005/0245644 A1 | 11/2005 | Smith et al. |
| 2005/0274450 A1 | 12/2005 | Smith et al. |
| 2005/0274540 A1 | 12/2005 | Smith et al. |
| 2005/0274774 A1 | 12/2005 | Smith et al. |
| 2005/0277349 A1 | 12/2005 | Smith et al. |
| 2005/0277350 A1 | 12/2005 | Smith et al. |
| 2005/0277351 A1 | 12/2005 | Smith et al. |
| 2005/0277721 A1 | 12/2005 | Smith et al. |
| 2006/0034787 A1 | 2/2006 | Bujard |
| 2006/0142471 A1 | 6/2006 | Shindo |
| 2006/0231201 A1* | 10/2006 | Smith et al. ............... 156/307.3 |
| 2006/0234027 A1* | 10/2006 | Huusken .................. 428/292.1 |
| 2006/0234576 A1 | 10/2006 | Smith et al. |
| 2006/0258791 A1* | 11/2006 | Okamoto et al. ............ 524/449 |
| 2006/0280873 A1 | 12/2006 | Smith et al. |
| 2006/0281380 A1 | 12/2006 | Smith et al. |
| 2006/0281833 A1 | 12/2006 | Smith et al. |
| 2007/0026221 A1 | 2/2007 | Stevens et al. |
| 2007/0114704 A1 | 5/2007 | Stevens et al. |
| 2007/0141324 A1 | 6/2007 | Stevens et al. |
| 2008/0050580 A1 | 2/2008 | Stevens et al. |
| 2008/0066942 A1 | 3/2008 | Miller |
| 2008/0262128 A1 | 10/2008 | Stevens et al. |

FOREIGN PATENT DOCUMENTS

| | | |
|---|---|---|
| EP | 0266602 A1 | 11/1988 |
| EP | 0 394 767 A2 | 10/1990 |
| EP | 0 604 804 A2 | 7/1994 |
| EP | 1 220 240 A1 | 7/2002 |
| EP | 1 300 439 A1 | 4/2003 |
| EP | 1 383 226 A1 | 1/2004 |
| EP | 1 384 567 A1 | 1/2004 |
| EP | 1 486 997 A1 | 12/2004 |
| EP | 1 530 223 A1 | 5/2005 |
| GB | 881036 A2 | 11/1961 |
| JP | 56029305 | 3/1981 |
| JP | 03205443 A | 9/1991 |
| JP | 06313267 A | 11/1994 |
| JP | 10-088201 | 4/1998 |
| JP | 10-211659 | 8/1998 |
| JP | 2002212422 A | 7/2002 |
| JP | 200506389 A | 1/2005 |
| JP | 2005-199562 A | 7/2005 |
| WO | WO 95/02504 A1 | 1/1995 |
| WO | WO 96/28073 A1 | 9/1996 |
| WO | WO 98/41993 A1 | 9/1998 |
| WO | WO 99/26286 A1 | 5/1999 |
| WO | WO 00/56127 A1 | 9/2000 |
| WO | WO 01/68749 A1 | 9/2001 |
| WO | WO 01/84659 A1 | 11/2001 |
| WO | WO 03/040445 A1 | 5/2003 |
| WO | WO 2004/006271 A1 | 1/2004 |
| WO | WO 2004/052999 A2 | 6/2004 |
| WO | WO 2004/067606 A1 | 8/2004 |
| WO | WO 2005/069312 | 7/2005 |
| WO | WO 2005/106089 A2 | 11/2005 |
| WO | WO 2005/123825 A2 | 12/2005 |
| WO | WO 2005/124790 A2 | 12/2005 |
| WO | WO 2006/002014 A1 | 1/2006 |
| WO | WO 2006/007385 A1 | 1/2006 |

OTHER PUBLICATIONS

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Von Roll Isola, "Mica Tapes," product literature, 381.58, date unknown.

Tomoyuki Matsumura "Phase Structures and Thermal and Conductive Properties of Epoxy-Alumina Hybrids Filled with Conductive Fillers," STN Database No. 2002:257918, Apr. 8, 2002, Abstract pp. 1-2; XP-002356007.

Yasufumi Shibata, "Lipophillic Inorganic-Organic Fillers with Low Frictional Coefficient," STN Database No. 2002:568167, Jul. 31, 2002, Abstract pp. 1-3; XP-002355912.

Derwent Acc-No. 1980-39239C (JP 55053802 A Derwent Abstract) (Nippon Mica Seisaku).

Product Data Sheet for Polar Therm Boron Nitride Powder Grades PT120, PT140, PT160, and PT 180, provided by Momentive Performance Materials (2007).

* cited by examiner

HIGH THERMAL CONDUCTIVITY DIELECTRIC TAPE

FIELD OF THE INVENTION

The field of the invention relates to multi-purpose electrical insulation tapes.

BACKGROUND

With the use of any form of electrical equipment that includes high voltage or high current carrying conductors, there is typically a need for heat dissipation qualities of the insulating materials. With the push to continuously reduce the size and to streamline all electrical and electronic systems, there is a corresponding need to find better and more compact insulators and insulation systems.

Various organic polymer thermoset resin materials, like epoxy, polyester, and phenolic formulations, have been used extensively in electrical insulation systems because of the practical benefits they possess; they are tough and flexible electrical insulation materials that can be easily adhered to surfaces. Traditional high voltage electrical insulation materials, such as mica particles in flake or splittings form and glass fiber, can be surface coated and bonded with common thermoset polymeric resins to produce composite materials with increased mechanical strength, chemical resistance, and electrical insulating properties. In many cases, epoxy based polymeric resins are used due to their adjustable liquid properties, excellent bond strength to variety of materials and outstanding dielectric properties.

Good electrical insulators, by their very nature, also tend to be good thermal insulators; a property which is undesirable. Thermal insulating behavior, particularly for air-cooled electrical equipment and components, reduces the efficiency and durability of the components, as well as the equipment as a whole. It is desirable to produce electrical insulation systems that have maximum electrical insulation and minimal thermal insulation characteristics.

Electrical insulation often appears in the form of insulating tapes, which themselves have various layers. Common to these types of tapes is a dielectric layer that is bonded at an interface to a carrier layer for tensile strength, both layers tending to be impregnated with a polymeric resin. A favored type of electrical insulation material is mica-tape. Improvements to mica-tapes include catalyzed mica-tapes as taught in U.S. Pat. No. 6,103,882. The mica-tape may be wound around conductors to provide extremely good electrical insulation. An example of this is shown in FIG. 1. Illustrated here is a coil 13, comprising a plurality of turns of conductors 14, which in the example illustrated here are assembled into a bakelized coil. The conductor insulation 15 is prepared from a fibrous material, for example, glass fabric or glass mat and Dacron mat, or polymeric films made from polyester or polyimide which is heat treated. Ground insulation for the coil is provided by wrapping one or more layers of composite mica tape 16 about the bakelized coil 14. Such composite tape may be a paper or felt of small mica flakes combined with a pliable backing sheet 18 of, for example, glass fiber cloth or polyethylene glycol terephthalate mat, the layer of mica 20 being bonded thereto by a liquid resinous binder. Generally, a plurality of layers of the composite tape 16 are wrapped about the coil depending upon voltage requirements. A wrapping of an outer tape 21 of a tough fibrous material, for example, glass based tape, may be applied to the coil.

Generally, multiple thin layers of the mica tape 16 are wrapped about the coil with sixteen or more layers usually being used for high voltage coils. Polymeric resins are then impregnated into the tape layers. These impregnating resins can also be used as insulation independently from the insulating tape. Unfortunately, this amount of insulation further adds to the complications of dissipating heat. What is needed is electrical insulation that can conduct heat with higher conductivity than that of conventional methods, without compromising the electrical insulation and other performance factors, including mechanical and thermal capability, as well as being able to be used in a wide range of applications.

Other difficulties with the prior art exist, some of which will be apparent upon further reading.

SUMMARY OF THE INVENTION

With the foregoing in mind, methods and apparatuses consistent with the present invention, which inter alia facilitates insulation by taping include a tape that includes two glass based carriers that sandwich a dielectric thermally conductive, electrically insulative filler layer. The thermally conductive, electrically insulative filler layer is a combination of mica particles/flaklets and other thermally conductive filler particles. The filler particles are highly thermally conducting, and relatively not electrically conducting. They can be of a variety of sizes, but in particular are from 1-1000 nm in their longest dimension, and are particularly formed from nitrides, carbides and oxides. The ratio of filler particles to mica flakelets in the filler layer should be no greater than 1:1 by volume.

The filler layer will also have a binder resin that is uniformly mixed with the mica flakelets and filler particles. The amount of resin in the filler layer can vary, but should be kept to minimum at approximately 25-50% by volume of the filler layer. The glass carrier layers will also be impregnated with a thermoset polymeric resin, though it may be of a different type than that used in the filler layer, typically, the same types of polymeric resins are used for chemical compatibility of all the tape constituents, (i.e., epoxy resins). For ease of handling, the resins can be partially cured prior to application of the tape, and in some applications, a b-stage tape may be advantageous.

The thickness of the filler layer can be varied depending on the application, but in general, is from approximately 3-5 mils (0.076-0.127 mm) thick. The glass carrier layers are each approximately 1-3 mils (0.025-0.050 mm) thick.

These and other objects, features, and advantages in accordance with the present invention are provided particular embodiments by an electrical insulation tape that comprises a first and a second carrier layer, and a dielectric filler layer that comprises mice flakelets, filler particles and a binder resin, disposed between the first and the second carrier layers. In one aspect the filler particles are discoids and platelets, and in another aspect, the binder resin includes epoxy, polyimide epoxy, liquid crystal epoxy and cyanate-ester.

In a more particular aspect, the carrier layers are glass fabric. The ratio of the mica flakelets to the filler particles is at least 1:1 by volume, the percentage of the binder resin in the dielectric filler layer is 25-50% by volume, and the first and the second carrier layers are impregnated with a second resin.

In a particular aspect, the second resin is a thermoset polymeric resin like epoxy or other previously mentioned thermoset resin, and in another aspect, the second resin is a b-stage resin.

In one aspect, the inorganic filler particles have a length of between 1-100,000 nm and an aspect ratio of approximately 5-50. In another aspect, the inorganic filler particles are selected from at least one of oxides, nitrides, and carbides, or in another aspect, the dielectric filler layer is at least one of oxides, nitrides, and carbides comprising Al2O3, AlN, MgO, ZnO, BeO, BN, Si3N4, SiC and SiO2 with mixed stoichiometric and non-stoichiometric combinations.

In yet another aspect, the inorganic filler particles have been surface treated to introduce surface functional groups that allow for the essentially complete co-reactivity with the binder resin, and in a more particular aspect, the functional groups comprise at least one of hydroxyl, carboxylic, amine, epoxide, silane and vinyl groups.

In another embodiment, the present invention provides for an electrical insulation tape that comprises a first and a second glass fabric layer, and a dielectric filler layer that comprises mica flakelets, inorganic thermally conductive, electrically resistive filler particles and a binder resin disposed between the first and the second glass fabric layers. This embodiment provides for a ratio of mica flakelets to filler particles of at least 1:1 by volume, and the percentage of the binder resin in the filler layer is 25-50% by volume. Finally, the first and the second glass fabric layers are pre-impregnated with a second thermoset polymeric resin. In a more particular aspect, the second thermoset polymeric resin is a b-stage resin.

In yet another embodiment, the present invention provides for a method for making an insulation tape that comprises obtaining a first carrier layer and a second carrier layer, such as a glass fabric, impregnating a second resin into the first and second carrier layers. The carrier layers can be pre-impregnated with the second resin. The coating the first carrier layer with a dielectric filler layer, and adding the second carrier layer to the dielectric filler layer.

In a particular aspect, the coating of the dielectric filler layer onto the first carrier layer is done by a sol-gel liquid ceramic/glass modified polymeric formulation binder with a high loading of the inorganic particle fillers. The dielectric filler layer is comprised of mica flakelets, filler particles, and a binder resin, the percentage of the binder resin in the dielectric filler layer is 25-50% by volume, the ratio of the mica flakelets to the filler particles in the dielectric filler layer is at least 1:1 by volume, and the dielectric filler layer is at least one of oxides, nitrides, and carbides. And finally, in one aspect, the insulation tape is fully cured after being applied to an electrical device.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
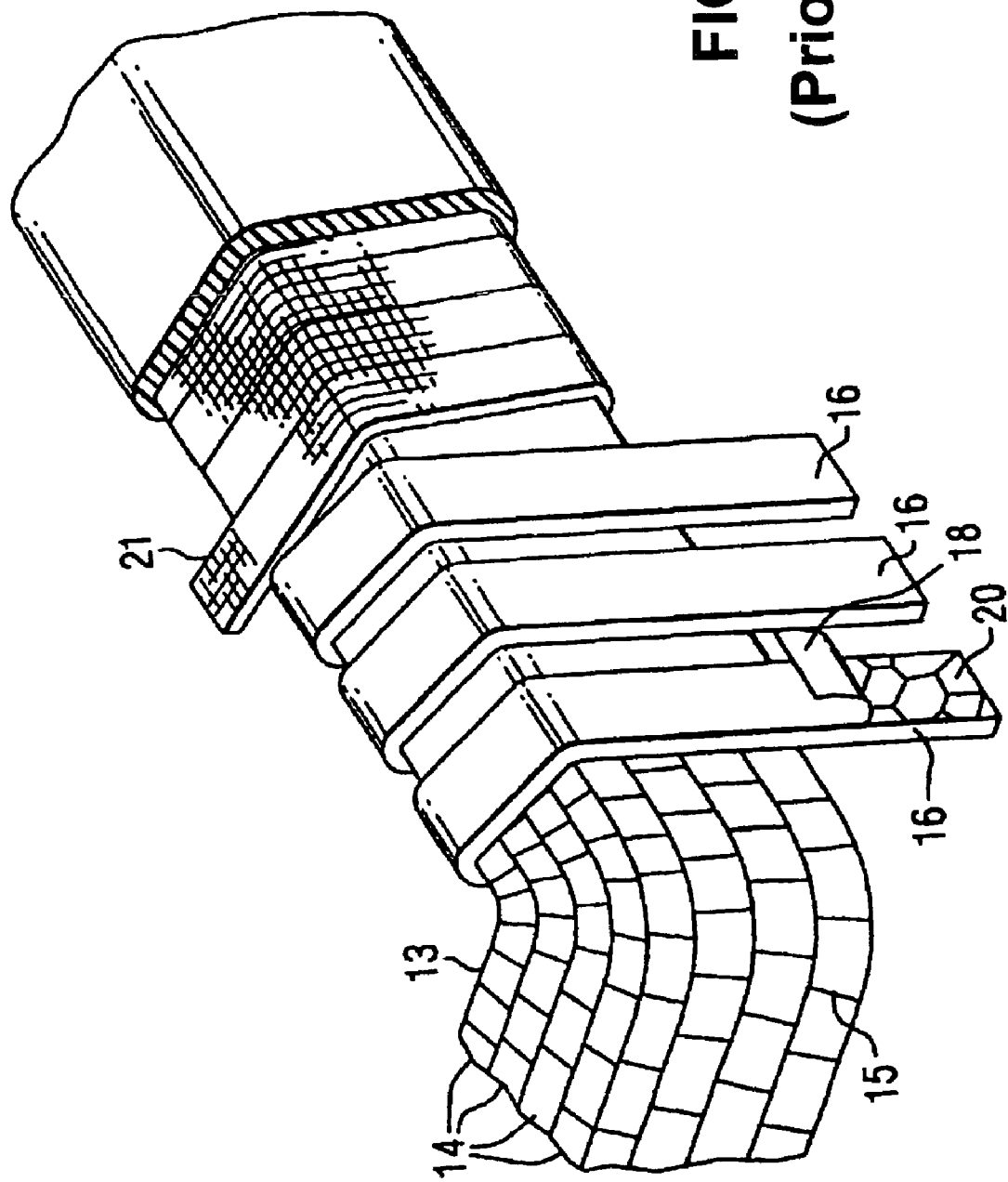
FIG. 1 shows the use of an insulating tape being lapped around a wound conductor coil.

The present invention provides for a versatile insulating tape that comprises a highly thermally conductive dielectric layer sandwiched between two glass carrier layers. In the prior art, mica tapes are fragile and difficult to handle, they are thermally insulating, and not applicable to a wide range of industries. The present invention provides for an electrical insulation tape that uses the electrical resistivity properties of mica, the thermal conductivity of special thermally conductive, electrically insulative fillers in the dielectric layer, and the strength and flexibility of glass carriers.

The tape includes two glass carriers that sandwich a dielectric layer, with mica particles and thermally conductive, electrically insulative particles in a polymeric binder. The dielectric thermally conductive, electrically insulative filler layer is a combination of mica particles/flakelets and thermally conductive filler particles. The filler particles are highly thermally conducting, and relatively not electrically conducting. They can be of a variety of sizes, but in particular, are from 1-1000 nm in their longest dimension, and are particularly formed from nitrides, carbides and oxides. The ratio of filler particles to mica flakelets in the filler layer should be no greater than 1:1 by volume; that is, the solid phase in the filler layer should be at least 50% mica. The inorganic filler particles can be of a variety of shapes, which preferably are complimentary to the mica particles, eg platelets and discoids, to maximize the surface area that would contact adjacent filler particles.

The dielectric filler layer will also have a resin that is uniformly mixed with the mica flakelets and filler particles. The amount of resin in the filler layer can vary, but should be approximately 25-50% by volume of the filler layer to minimize organic content. The glass carrier layers will also be impregnated with a thermoset polymeric resin, although it may be of a different type than that used in the filler layer. For ease of handling, the binder resin in the dielectric layer and the carrier resin can be partially cured or fully cured prior to application of the tape.

The thickness of the filler layer can be varied depending on the application, but in general, is from approximately 3-5 mils (0.076-0.127 mm) thick. The glass carrier layers are from approximately 1-3 mils (0.025-0.050 mm) thick each.

In assembling the tape, the resinous dielectric filler layer is coated on a first layer of resin treated glass carrier. Then, the second layer of resin treated glass carrier is placed on top of the dielectric filler layer. A thermoset polymeric resin can later be impregnated into the wound tape in order to eliminate voids in the taped conductor assembly.

For example, when coating the first glass layer with the filler layer, a sol-gel ceramic/glass modified polymeric formulation can be used as a binder with a high loading of the inorganic thermally conductive, electrically insulative particle fillers added. The dielectric layer is then covered by a thermoset resin treated glass carrier. A top layer of organic resin treated glass carrier is then added for increased tensile strength.

Figure 2:
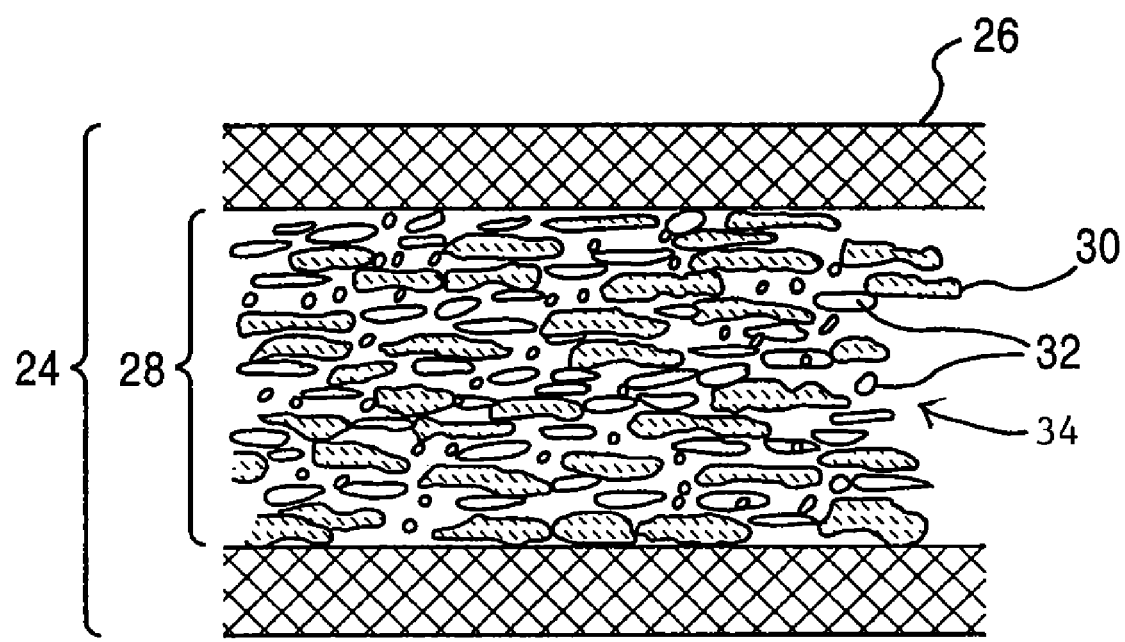
FIG. 2 illustrates a stylized cross section of a tape according to the present invention.

Referring to FIG. 2, an embodiment of the present invention is shown. Although stylized, an example of the general proportions of the tape 24 are shown. The dielectric filler layer 28 is sandwiched between two layers of resin impregnated glass carrier, the glass carrier could be fleece, mat or fabric structure 26. The resin in the glass carrier is generally a semi-cured resin, which makes handling of tapes easier, and which improves curing times in applications. The filler layer 28, which provides the majority of the dielectric strength to the tape, is comprised of three materials: mica flakelets 30, which are generally from 0.01 to 0.05 mm in diameter, inorganic fillers that are thermally conductive and electrically insulative 32, and a thermoset polymeric binder resin 34.

Mica, a group of silicates, such as $KAl_2 AlSi_3 O_{10} (OH)_2$ (Muscovite) or $KMg_3 AlSi_3 O_{10} (OH)_2$ (phlogopite), has long been a key component of high voltage electrical insulation in electrical machines over 440 V, because of its particularly high dielectric strength, low dielectric loss, high resistivity, excellent thermal stability and excellent corona resistance. Presently, mica is used in the form of flakes on a glass carrier backing, which provides mechanical integrity required for machine wrapping of coils, as shown for example in U.S. Pat.

Nos. 4,112,183 and 4,254,351 (Smith and Smith et al.), respectively. In many cases, mica tape is wrapped around the coil and then impregnated with low viscosity liquid insulation resin by vacuum-pressure impregnation ("VPI"). That process consists of evacuating a chamber containing the coil in order to remove air and moisture trapped in the mica tape, then introducing the insulation resin under pressure to impregnate the mica tape completely with resin, thus eliminating voids, and producing resinous insulation in a mica matrix. This resin is subsequently cured by a prolonged heating cycle.

Fillers may be metal oxides, metal nitrides, and metal carbides, as well as some non-metal oxides, nitrides and carbides. For example, alumina, magnesia, zirconia and other metal oxides as well as boron nitride, aluminum nitride, other metal nitrides, metal carbides and diamond of natural or synthetic origin. The filler particles can be of the various physical forms of each type listed, and the particles may be hybrids of the materials mentioned and have stoichiometric and non-stoichiometric mixed oxides, nitrides and carbides. More specific examples of these include $Al_2O_3$, AlN, MgO, ZnO, BeO, BN, $Si_3N_4$, SiC, SiO, and $SiO_2$ with mixed stoichiometric and non-stoichiometric combinations. Also, non-oxide ceramics with high thermal conductivity like silicides or nitrides. Further, these particles will be surface treated to introduce a variety of surface functional groups which are capable of participating in reactions with the host organic polymer resin binder of the dielectric filler layer. It is also possible to coat non-High Thermal Conductivity (HTC) materials, such as silica and other filler particle materials, with an HTC material. In particular embodiments, filler particles are from 5-100,000 nm in major axis length and have an aspect ratio of between 3-100. These inorganic nano-particles can also contain reactive surfaces to form intimate covalently bonded hybrid organic-inorganic homogeneous materials.

One type of resinous composition that can be used can be obtained by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, providing a diglycidyl ether of bisphenol A type epoxide or a diglycidyl ether of bisphenol F type epoxide. The bisphenol epoxides have a 1,2-epoxy equivalency greater than one and will generally be diepoxides.

Other glycidylether resins that are useful include polyglycidyl ethers of a novolac prepared by reacting an epihalohydrin with an aldehyde, for example, a phenol formaldehyde condensate. Cycloalyphatic type epoxides are also useful, as are glycidyl ester epoxy resins, both being non-glycidyl ether epoxides, all of which are well known in the art and described in detail by Smith et al, in U.S. Pat. No. 4,254,351, where epoxidized polybutadiene, also useful in this invention, is described. These resinous compositions are referred to as polyepoxide resins. Example of thermoset resins include epoxies, polyesters, phenolics, cyanate esters, polyimides, silicone resins, and styrenated resins. A special version epoxy resins based on Liquid Crystal Thermoset (LCT) structures provide improved thermal conductivity versus amorphous epoxy polymeric resins.

Other useful resins include polyesters, and 1-2, polybutadienes, all of which are well known in the art. Generally, polyester resins are a large group of synthetic resins, almost all produced by reaction of dibasic acids with dihydric alcohols. In a few cases, trifunctional monomers such as glycerol or citric acid are used. The term polyester resin applies especially to the products made from unsaturated dibasic acids such as maleic acid. Unsaturated polyester resins can be further polymerized through cross linking. Often, another unsaturated monomer such as styrene is added during this second stage of the polymerization, which can occur at ordinary temperatures with suitable peroxide catalysts. Maleic anhydride and fumaric acid are the usual unsaturated acid components, while phthalic anhydride, or adipic or azelaic acid are the corresponding saturated materials. Commonly used glycols include ethylene, propylene, diethylene, dipropylene, and certain butylene glycols. The added polymerizable monomer includes styrene, vinyltoluene, diallyl phthalate or methyl methacrylate. In addition to the unsaturated polyester resins, there are other important types. One large group are the alkyd resins, which are made from saturated acid and alcohol monomers with many types of modifications, usually the inclusion of an unsaturated fatty acid.

Commonly used epoxy resins are bisphenol A and bisphenol F resins, which are readily commercially available from Dow Chemical Co and other resin suppliers. The bisphenol F is more fluid and therefore may more readily penetrate the damaged areas in many circumstances. Though the patching resin of the present invention may have a great range of viscosities depending on use, in a preferred embodiment, the viscosity is 100-300 centipoise (cps), with a particular viscosity of 120-175 cps.

In one embodiment, the present invention provides for an electrical insulation tape that comprises a first and a second carrier layer, and a dielectric thermally conductive, electrically insulative filler layer that comprises mica particles, thermally conductive, electrically insulative filler particles and a binder resin, disposed between the first and the second carrier layers. In one aspect the thermally conductive, electrically insulative filler particles are discoids and platelets, and in another aspect, the binder resin includes epoxy, polyimide epoxy, liquid crystal epoxy and cyanate-ester.

In a more particular aspect, the carrier layers are glass fabric. The ratio of the mica particles to the thermally conductive, electrically insulative filler particles is at least 1:1 by volume, the percentage of the binder resin in the dielectric thermally conductive, electrically insulative filler layer is 25-50% by volume, and the first and the second carrier layers are impregnated with a second resin.

In a particular aspect, the second resin is a thermoset polymeric resin like epoxy or other previously mentioned thermoset resin, and in another aspect, the second resin is a b-stage resin.

In one aspect, the inorganic thermally conductive, electrically insulative filler particles have a length of between 1-100,000 nm and an aspect ratio of approximately 5-50. In another aspect, the inorganic thermally conductive, electrically insulative filler particles are selected from at least one of oxides, nitrides, and carbides, or in another aspect, the dielectric thermally conductive, electrically insulative filler layer is at least one of oxides, nitrides, and carbides comprising Al2O3, AlN, MgO, ZnO, BeO, BN, Si3N4, SiC and SiO2 with mixed stoichiometric and non-stoichiometric combinations.

In yet another aspect, the inorganic thermally conductive, electrically insulative filler particles have been surface treated to introduce surface functional groups that allow for the essentially complete co-reactivity with the binder resin, and in a more particular aspect, the functional groups comprise at least one of hydroxyl, carboxylic, amine, epoxide, silane and vinyl groups.

In another embodiment, the present invention provides for an electrical insulation tape that comprises a first and a second glass fabric layer, and a dielectric thermally conductive, electrically insulative filler layer that comprises mica particles, inorganic thermally conductive, electrically resistive thermally conductive, electrically insulative filler particles and a binder resin disposed between the first and the second glass fabric layers. This embodiment provides for a ratio of mica particles to thermally conductive, electrically insulative filler particles of at least 1:1 by volume, and the percentage of the binder resin in the thermally conductive, electrically insulative filler layer is 25-50% by volume. Finally, the first and the second glass fabric layers are pre-impregnated with a second thermoset polymeric resin. In a more particular aspect, the second thermoset polymeric resin is a b-stage resin.

In yet another embodiment, the present invention provides for a method for making an insulation tape that comprises obtaining a first carrier layer and a second carrier layer, such as a glass fabric, impregnating a second resin into the first and second carrier layers. The carrier layers can be pre-impregnated with the second resin. The coating the first carrier layer with a dielectric thermally conductive, electrically insulative filler layer, and adding the second carrier layer to the dielectric thermally conductive, electrically insulative filler layer.

In a particular aspect, the coating of the dielectric thermally conductive, electrically insulative filler layer onto the first carrier layer is done by a sol-gel liquid ceramic/glass modified polymeric formulation binder with a high loading of the inorganic particle thermally conductive, electrically insulative fillers. The dielectric thermally conductive, electrically insulative filler layer is comprised of mica particles, thermally conductive, electrically insulative filler particles, and a binder resin, the percentage of the binder resin in the dielectric thermally conductive, electrically insulative filler layer is 25-50% by volume, the ratio of the mica particles to the thermally conductive, electrically insulative filler particles in the dielectric thermally conductive, electrically insulative filler layer is at least 1:1 by volume, and the dielectric thermally conductive, electrically insulative filler layer is at least one of oxides, nitrides, and carbides. And finally, in one aspect, the insulation tape is fully cured after being applied to an electrical device.

The term carrier as used herein, refers to any type of glass-fiber-based or organic-fiber-based material commonly used in insulating tape. The carrier's physical form can include mats, fabrics and fleeces composed of materials like polyester, E-glass or ceramic metal oxides. Although high thermal conductive glass or ceramic metal oxide carriers are common embodiments of this invention, the present invention may also be used with organic polymer carriers such as Dacron™, polyester terapthalate (PET) or densified aramid paper commonly known as Nomex™.

While specific embodiments of the invention have been described in detail, those skilled in the art will appreciate that various modifications and alternatives to those details could be developed in light of the overall teachings of the disclosure. Accordingly, the particular arrangements disclosed are meant to be illustrative only, and not meant to limit the scope of the invention, which is to be given the full breadth of the claims appended and any and all equivalents thereof.

What is claimed is:

1. An electrical insulation tape comprising:
a first and second carrier layers; and
a dielectric filler layer disposed between said first and said second carrier layers;
wherein said dielectric filler layer comprises mica flakelets, filler particles and a binder resin;
wherein the ratio of said mica flakelets to said filler particles is at least 1:1 by volume;
wherein the percentage of said binder resin in said dielectric filler layer is 25-50% by volume;
wherein said first and said second carrier layers are impregnated with a second resin, wherein said second resin is a thermoset polymeric resin;
wherein said filler particles comprise at least one of ZnO, BeO and SiC; and
wherein said filler particles have a length of between 1-100,000 nm and an aspect ratio of approximately 5-50.

2. The electrical insulation tape according to claim 1, wherein said second resin is a b-stage resin.

3. The electrical insulation tape according to claim 1, wherein said carrier layers are glass fabric.

4. The electrical insulation tape according to claim 1, wherein said filler particles are discoids and platelets.

5. The electrical insulation tape according to claim 1, wherein said filler particles have been surface treated to introduce surface functional groups that allow for the essentially complete co-reactivity with said binder resin.

6. The electrical insulation tape according to claim 5, wherein said functional groups comprise at least one of hydroxyl, carboxylic, amine, epoxide, silane and vinyl groups.

7. The electrical insulation tape according to claim 1, wherein said binder resin includes epoxy, polyimide epoxy, liquid crystal epoxy or cyanate-ester.

8. An electrical insulation tape comprising:
a first and a second glass fabric layer; and
a dielectric filler layer disposed between said first and said second glass fabric layers;
wherein said dielectric filler layer comprises mica flakelets, thermally conductive filler particles and a binder resin;
wherein the ratio of said mica flakelets to said filler particles is at least 1:1 by volume;
wherein the percentage of said binder resin in said filler layer is 25-50% by volume;
wherein said first and said second glass fabric layers are pre-impregnated with a second thermoset polymeric resin;
wherein the thermally conductive filler particles further comprise particles of an inorganic material coated with a material exhibiting a higher thermal conductivity than that of the inorganic material.

9. The electrical insulation tape according to claim 8, wherein said second thermoset polymeric resin is a b-stage resin.

10. The electrical insulation tape of claim 8, wherein the inorganic material comprises silica.

11. The electrical insulation tape of claim 8, wherein the material exhibiting a higher thermal conductivity than that of the inorganic material comprises at least one of ZnO, BeO and SiC.

* * * * *